United States Patent
Song et al.

(10) Patent No.: US 9,537,998 B2
(45) Date of Patent: Jan. 3, 2017

(54) APPARATUS AND METHOD FOR DISPLAYING MESSAGES IN A MOBILE TERMINAL

(75) Inventors: Eun-Young Song, Seoul (KR); Beom-Soo Cho, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 861 days.

(21) Appl. No.: 12/587,061

(22) Filed: Sep. 30, 2009

(65) Prior Publication Data

US 2010/0081463 A1    Apr. 1, 2010

(30) Foreign Application Priority Data

Sep. 30, 2008    (KR) .................. 10-2008-0095865

(51) Int. Cl.
| | | |
|---|---|---|
| H04W 4/00 | (2009.01) | |
| H04M 1/00 | (2006.01) | |
| G06F 3/00 | (2006.01) | |
| H04M 1/725 | (2006.01) | |
| H04W 4/12 | (2009.01) | |
| H04W 88/02 | (2009.01) | |

(52) U.S. Cl.
CPC ........... *H04M 1/72552* (2013.01); *H04W 4/12* (2013.01); *H04W 88/02* (2013.01)

(58) Field of Classification Search
CPC .... G06Q 10/107; H04L 12/586; H04L 12/589
USPC .......................................... 455/466; 715/752
See application file for complete search history.

(56) References Cited

U.S. PATENT DOCUMENTS

| | | | | |
|---|---|---|---|---|
| 7,164,928 | B2 * | 1/2007 | Ding et al. ................... | 455/466 |
| 2006/0036696 | A1 * | 2/2006 | Maresh ........................ | 709/206 |
| 2006/0101127 | A1 * | 5/2006 | Brown ......................... | 709/207 |
| 2006/0168046 | A1 * | 7/2006 | Qureshi ....................... | 709/206 |
| 2007/0185961 | A1 * | 8/2007 | Perlow et al. ................ | 709/206 |
| 2007/0287483 | A1 |  12/2007 | Park et al. | |

FOREIGN PATENT DOCUMENTS

| | | |
|---|---|---|
| JP | 2004-159261 A | 6/2004 |
| KR | 10-2007-0029983 A | 3/2007 |
| KR | 10-0711523 | 4/2007 |

OTHER PUBLICATIONS

Notice of Preliminary Rejection dated Oct. 21, 2014 in connection with Korean Patent Application No. 10-2008-0095865; 26 pages.
Notice of Patent Grant dated Dec. 29, 2014 in connection with Korean Patent Application No. 10-2008-0095865; 7 pages.

* cited by examiner

*Primary Examiner* — Joshua Schwartz

(57) ABSTRACT

A mobile terminal includes an apparatus for displaying messages. When a message is transmitted or received, whether the message has a relation with stored messages is determined. When it is determined that the message has a relation with at least one of the stored messages, the message is assigned the same tag as a tag of the at least one message. When a related message view command for one of the message and the at least one message occurs, contents of messages comprising the tag are displayed together.

22 Claims, 6 Drawing Sheets

APPARATUS AND METHOD FOR DISPLAYING MESSAGES IN A MOBILE TERMINAL

CROSS-REFERENCE TO RELATED APPLICATION(S) AND CLAIM OF PRIORITY

The present application claims the benefit under 35 U.S.C. §119(a) of a Korean patent application filed in the Korean Intellectual Property Office on Sep. 30, 2008 and assigned Serial No. 10-2008-0095865, the entire disclosure of which is hereby incorporated by reference.

TECHNICAL FIELD OF THE INVENTION

The present invention relates to a mobile terminal. More particularly, the present invention relates to an apparatus and a method for displaying a message in a mobile terminal.

BACKGROUND OF THE INVENTION

In modern society, mobile terminals have been rapidly distributed due to the mobile terminal's convenience and necessity, and now, the mobile terminal has become a necessity of a modern people. Therefore, service providers and terminal manufacturers provide numerous additional functions in order to increase utility of the mobile terminal. For example, the mobile terminal includes functions such as a phone book, games, a scheduler, Short Message Service (SMS), multimedia message service, cell broadcasting service, an Internet service, an electronic (E)-mail, a morning call, Motion Picture Expert Group Audio Layer-3 (MP3), a digital camera, and so forth.

Of the above-listed various functions provided through the mobile terminal, SMS is one of most frequently used functions in the mobile terminal. Messages received and transmitted through the SMS are stored in a memory inside the mobile terminal. Therefore, a user can perform management functions such as search, check, delete, return, and the like with respect to messages transmitted and received in the past. For example, when a user intends to check contents of a stored message, a mobile terminal aligns and displays the stored messages in an order of a transmission time or a reception time. Additionally, when the user selects one of the aligned messages, the mobile terminal displays contents of the selected message.

Recently, studies of propensity to use of SMS by users show that two users engage in a conversation by giving and taking messages between them. In this case, the messages exchanged between the two users have a relation in their contents. Therefore, in the case where a user checks contents of a stored message, the user desires to check contents of related messages together. However, a message display function of a current mobile terminal cannot meet the above-described demand of users, and moreover, does not have even a capability of identifying related messages.

SUMMARY OF THE INVENTION

To address the above-discussed deficiencies of the prior art, it is a primary aspect of the present invention to address at least the above-mentioned problems and/or disadvantages and to provide at least the advantages described below. Accordingly, an aspect of the present invention is to provide an apparatus and a method for displaying related messages together in a mobile terminal.

Another aspect of the present invention is to provide an apparatus and a method for identifying related messages in a mobile terminal.

Still another aspect of the present invention is to provide an apparatus and a method for determining a relation between messages using reception/transmission history of messages in a mobile terminal.

In accordance with an aspect of the present invention, a method for displaying a message in a mobile terminal is provided. The method includes when transmitting or receiving a message, determining whether the message has a relation with stored messages, when it is determined that the message has a relation with at least one of the stored messages, assigning the message the same tag as a tag of the at least one message, and when a related message view command for one of the message and the at least one message occurs, displaying contents of messages including the tag together.

In accordance with another aspect of the present invention, an apparatus of a mobile terminal is provided. The apparatus includes a determination unit configured to, when transmitting or receiving a message, determine whether the message has a relation with stored messages, and when it is determined that the message has a relation with at least one of the stored messages, assign the message the same tag as a tag of the at least one message, and a controller configured to, when a related message view command for one of the message and the at least one message occurs, display contents of messages including the tag together.

Other aspects, advantages and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE PRESENT INVENTION

Figure 1A:
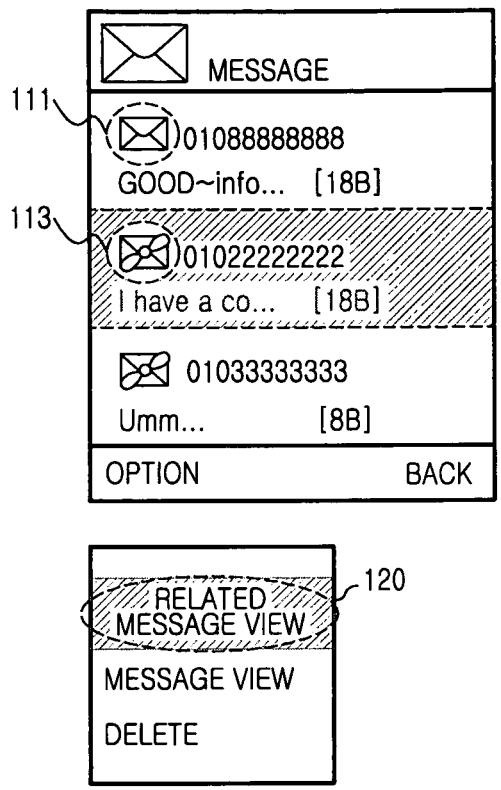
FIGS. 1A and 1B illustrate views of a message display screen in a mobile terminal according to an exemplary embodiment of the present invention.

FIGS. 1A through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile terminal.

Exemplary embodiments of the present invention provide a technique for identifying related messages and displaying the related messages together in a mobile terminal. In the following description, the mobile terminal denotes cellular phones, Personal Communication Systems (PCSs), Personal Digital Assistants (PDAs), International Mobile Telecommunication-2000 (IMT-2000) terminals, and the like.

According to an exemplary embodiment of the present invention, to display related messages together, a mobile terminal can classify related messages. Here, the relation of the messages is given by subjective recognition of a user, and so the mobile terminal cannot determine whether a message has the relation. However, the relation may be determined statistically through history of receiving/transmitting messages. Therefore, a mobile terminal according to an exemplary embodiment of the present invention can determine whether a message is related to other messages through a process of receiving/transmitting messages, and assigns the same tag to messages related to one another. Therefore, the mobile terminal displays related messages together by displaying messages with the same tag together.

The tag can be assigned using a reference time value determined according to a message reception/transmission pattern of a user. A process for determining whether to assign a tag changes according to respective circumstances, listed below. In the following description, a reference time value determined according to the message reception/transmission scheme of the user is referred to as a 'Time Interval Value (TIV)'.

In a first example, a message is received, and a different message for a caller of the message is stored in both a reception box and a transmission box. In this case, when a time difference between a reception time of the message and a reception or transmission time of the recently received or transmitted different message is smaller than the TIV, the mobile terminal determines that the message and the different message that has been recently received or transmitted are related to each other, and assigns, to the message, a tag assigned to the recently received or transmitted different message.

A second example is when a message is received, and a different message for a caller of the message is stored in a reception box but not stored in a transmission box. In this case, when a time difference between a reception time of the message and a reception time of the recently received different message is smaller than the TIV, the mobile terminal determines that the message and the recently received different message are related to each other, and assigns, to the message, a tag assigned to the recently received different message. At this point, when the tag has not been assigned to the recently received different message, the mobile terminal assigns a new tag to both the message and the recently received different message.

A third example is when a message is received, and a different message for a caller of the message is not stored in a reception box but stored in a transmission box. In this case, when a time difference between a transmission time of the recently transmitted different message and a reception time of the message is smaller than the TIV, the mobile terminal determines that the message and the recently transmitted different message are related to each other, and assigns, to the message, a tag assigned to the recently transmitted different message. At this point, in the case where the tag has not been assigned to the recently transmitted different message, the mobile terminal assigns a new tag to both the message and the recently transmitted different message.

In a fourth example, a message is received, and a different message for a caller of the message is not stored in both a reception box and a transmission box. In this case, the mobile terminal does not assign a tag to the message.

In a fifth example, a message is transmitted, and a different message for a callee of the message is stored in both a reception box and a transmission box. In this case, when a time difference between a reception or transmission time of the recently received or transmitted different message and a reception time of the message is smaller than the TIV, the mobile terminal determines that the message and the recently received or transmitted different message are related to each other, and assigns the message a tag assigned to the recently received or transmitted different message. At this point, in the case where the time difference is smaller than the TIV but a tag has not been assigned to the recently received or transmitted different message, the mobile terminal assigns a new tag to the message and the recently received or transmitted different message. Alternatively, when the time difference is greater than the TIV, the mobile terminal assigns a new tag to the message.

In a sixth example a message is received, and a different message for a caller of the message is stored in a reception box but not stored in a transmission box. In this case, when a time difference between a reception time of the recently received different message and a reception time of the message is smaller than the TIV, the mobile terminal determines that the message and the recently received different message are related to each other, and assigns, to the message, a tag assigned to the recently received different message.

In a seventh example, a message is transmitted, and a different message for a callee of the message is not stored in a reception box but stored in a transmission box. In this case, when a time difference between a transmission time of the recently transmitted different message and a reception time of the message is smaller than the TIV, the mobile terminal determines that the message and the recently transmitted different message are related to each other, and assigns the message a tag assigned to the recently transmitted different message. At this point, in the case where the time difference is smaller than the TIV but a tag has not been assigned to the recently transmitted different message, the mobile terminal assigns a new tag to both the message and the recently transmitted different message. Alternatively, when the time difference is greater than the TIV, the mobile terminal assigns a new tag to the message.

In an eight example, a message is transmitted, and a different message for a callee of the message is not stored in both a reception box and a transmission box. In this case, the mobile terminal assigns a new tag to the message.

In a ninth example, a reply message for a received message is transmitted. In this case, the mobile terminal assigns a tag assigned to the received message to the reply message regardless of a time difference between a reception time of the received message and a transmission time of the reply message. At this point, in the case where a tag has not been assigned to the received message, the mobile terminal assigns a new tag to both the reply message and the received message.

In the above-described tag assigning process, whether to assign a tag is determined depending on a TIV. The TIV is set based on a message transmission history of a user of a mobile terminal. For example, the TIV is calculated from an average of time differences between reception of a message and transmission of a reply message to the message, that is, a reply transmission time differences. That is, the average is set substantially immediately as the TIV, or the average is transformed according to a specific rule and then set as the TIV. In addition, the mobile terminal may use a plurality of different TIVs depending on a time band. That is, the mobile terminal may divide twenty-four (24) hours into a plurality of time sections, and calculate a TIV for each section using an average of reply transmission time differences at respective sections. For example, twenty-four (24) hours may be divided into four sections of "0' o'clock" to "6 o'clock", "6 o'clock" to "12 o'clock", "12 o'clock" to "18 o'clock", and "18 o'clock" to "24 o'clock". Accordingly, a different TIV is applied depending on a reception or transmission time of a message when the mobile terminal determines whether to assign a tag.

Figure 1B:
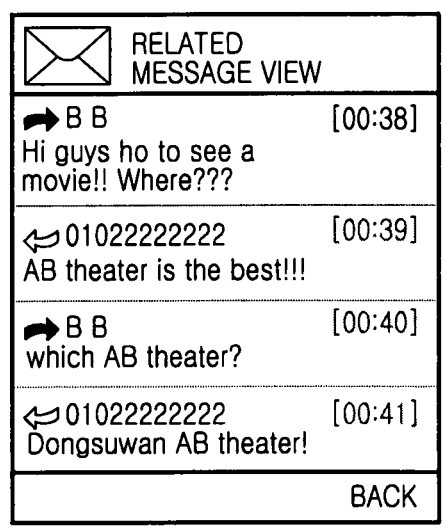

After assigning a tag as described above, the mobile terminal displays related messages together according to a request from a user. For this purpose, the mobile terminal displays a message having a related message under condition that the message is discriminated from a general message. For example, the mobile terminal discriminates a message having a related message from a general message by using an icon representing a message has a related message on a message list screen. That is, as illustrated in FIG. 1A, the mobile terminal displays a general message using a general message icon 111, and displays a message having a related message using a related message icon 113. In addition, the mobile terminal provides a 'related message view' item 120 in an option menu to allow that a user may selectively view all related messages or view only selected messages. That is, the 'related message view' item 120 is selected, the mobile terminal displays contents of related messages together as illustrated in FIG. 1B.

Hereinafter, a construction and an operational procedure of a mobile terminal that displays a message as described above will be described in more detail with reference to the drawings.

Figure 2:
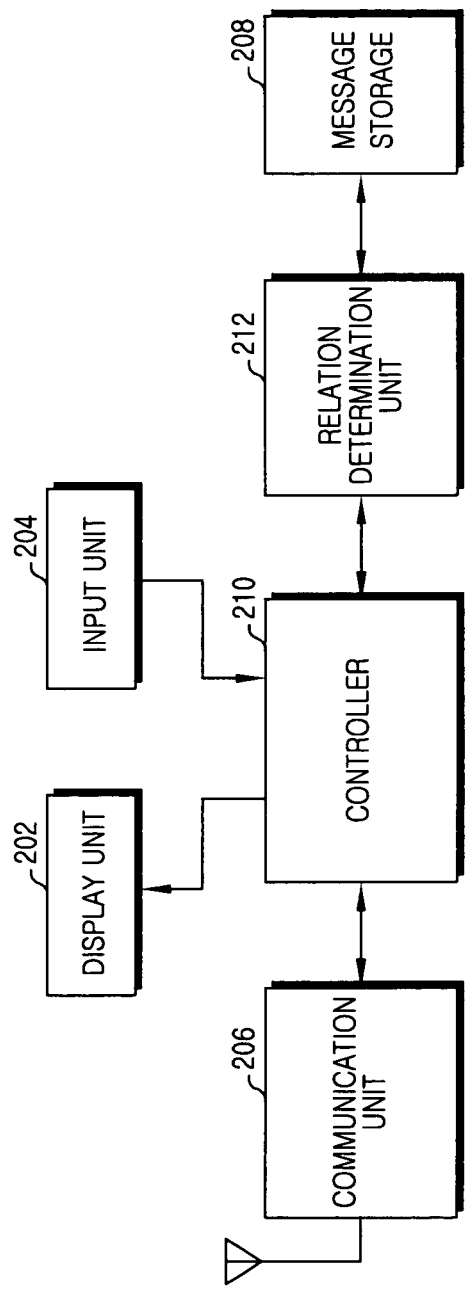
FIG. 2 illustrates a block diagram of a mobile terminal according to an exemplary embodiment of the present invention.

FIG. 2 illustrates a block diagram of a mobile terminal according to an exemplary embodiment of the present invention.

Referring to FIG. 2, the mobile terminal includes a display unit 202, an input unit 204, a communication unit 206, a message storage 208, a controller 210, and a relation determination unit 212.

The display unit 202 displays visual information. That is, the display unit 202 displays the state of the mobile terminal, numbers, letters, images, and so forth in a visual form that can be viewed by a user under control of the controller 210. For example, the display unit 202 may be one of a Cathode Ray Tube (CRT), a Liquid Crystal Display (LCD), and an Organic Light Emitting Diode (OLED). The input unit 204 includes a unit configured to recognize an input of a user, and provides information generated by the input of the user to the controller 210. For example, the input unit 204 includes at least one of a keypad, a touchpad, and a microphone.

The communication unit 206 processes a Radio Frequency (RF) signal transmitted/received via an antenna. That is, the communication unit 206 converts an RF signal received via the antenna into an information bit row, provides the information bit row to the controller 210, converts a transmission bit row provided from the controller 210 to an RF signal, and transmits the RF signal via the antenna. The message storage 208 stores messages received and transmitted via a message service. In other words, the message storage 208 stores a reception or transmission time of a message, a caller or a callee, and message contents. More particularly, the message storage 208 stores a tag for identifying a relation of messages. That is, with respect to one message, contents of the message, a reception or transmission time, and a caller or a callee are stored on a unit basis. In the case of a related message, a tag also is included.

The controller 210 controls an overall function of the mobile terminal. For example, when a message is received via the communication unit 206, the controller 210 informs a user of reception of the message through the display unit 202, and displays contents of the received message according to the user's manipulation. In addition, when transmission of a message is requested by the user's manipulation through the input unit 204, the controller 210 controls the communication unit 206 to transmit an input message.

More particularly, the controller 210 provides contents of a received message and a transmitted message, and information of a caller or a callee, and a reception time or a transmission time, to the relation determination unit 212 so that the relation determination unit 212 may determine a relation between messages. In addition, the controller 210 displays contents of related messages together using the display unit 202 according to the user's manipulation through the input unit 204. More specifically, when a message list display command occurs according to the user's manipulation, the controller 210 displays a message list including a message discrimination icon. Here, the message discrimination icon is designed for discriminating between a message having a related message and a general message, and includes a general message icon 111 and a related message icon 113 illustrated in FIG. 1A. Thereafter, when an option key input occurs with a cursor positioned at a related message, the controller 210 displays a menu including a related message view item. For example, the mobile terminal displays a menu including a 'related message view' item as illustrated in FIG. 1A. After displaying the menu, when the related message view item is selected, the controller 210 displays contents of messages having the same tag as a tag of a relevant message together. For example, the controller 210 displays contents of related messages through the display unit 202 as illustrated in FIG. 1B.

The relation determination unit 212 manages a TIV, which is a reference of relation determination, and determines whether a relation exists between messages. For example, the relation determination unit 212 calculates the TIV, and determines whether a relation exists between a message received or transmitted, and messages received or transmitted in the past. In addition, the relation determination unit 212 assigns the same tag to related messages, and provides a tag assignment result to the message storage 208.

The TIV management function is described. The relation determination unit 212 calculates a reply transmission time difference when a reply message is transmitted, and calculates an average of reply transmission time differences. In addition, the relation determination unit 212 calculates the TIV using the average. At this point, in the case where the TIV has been already calculated, the relation determination unit 212 updates the TIV. Here, the TIV may be set differently for each time section. In this case, the relation determination unit 212 determines a time section to which a transmission time of the reply message belongs, and calculates/updates a TIV of a relevant time section.

The relation determination and tag assignment function is described. The relation determination unit 212 assigns a reply message the same tag as a tag of an original message, which is an object of the reply message, assigns a received message the same tag as a tag of a recent message related to a caller of the received message, and assigns the transmitted message the same tag as a tag of a recent message related to a callee of the transmitted message. At this point, when assigning a tag to the received message or the transmitted message, the relation determination unit 212 assigns the tag only when a time difference between a reception or transmission time of the received or transmitted message, and a reception or transmission time of the recent message is smaller than a TIV. At this point, in the case where the TIV is set differently for each time section, the relation determination unit 212 uses a TIV of a time section including a reception or transmission time of a message. However, in the case where a tag assigned to the recent message does not exist, when an object of tag assignment is a received message, the relation determination unit 212 does not assign a tag. When an object of tag assignment is a transmitted message, the relation determination unit 212 assigns a new tag to the transmitted message and the recent message. In addition, when an object of tag assignment is a transmitted message, and the time difference is equal to or greater than a TIV, the relation determination unit 212 assigns a new tag to the transmitted message.

In the block diagram of the mobile terminal illustrated in FIG. 2, the controller 210 and the relation determination unit 212 may be incorporated into one block. That is, separate configuration and illustration of the controller 210 and the relation determination unit 212 in an exemplary embodiment of the present invention is for clearly describing the function of each block. When the present invention is embodied, the controller 210 and the relation determination unit 212 may be physically separated or incorporated into one block. In addition, the relation determination unit 212 may be provided as a middleware which is not incorporated in an application level.

Figure 3A:
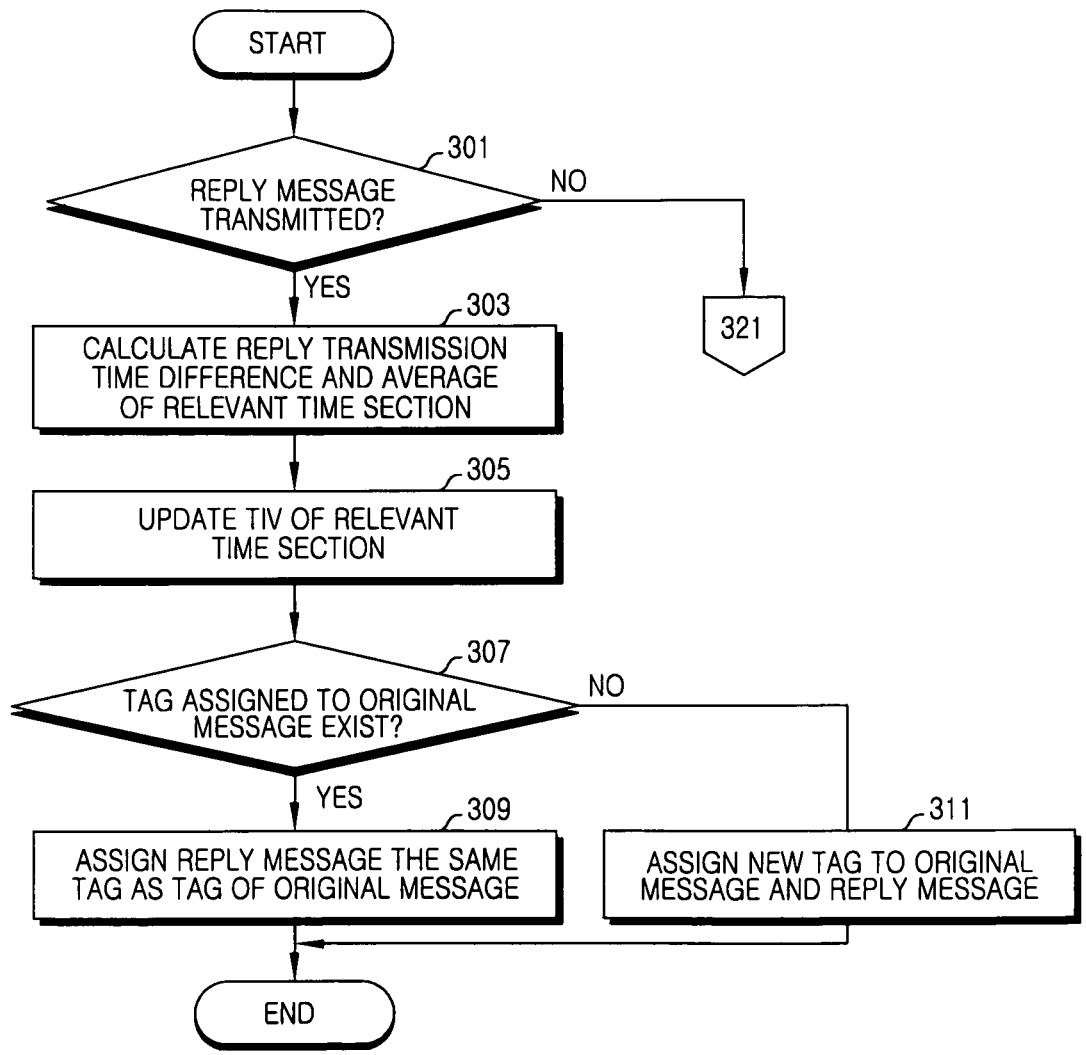
FIGS. 3A to 3C illustrate flowcharts for a tag assigning procedure of a mobile terminal according to an exemplary embodiment of the present invention.
Figure 3B:
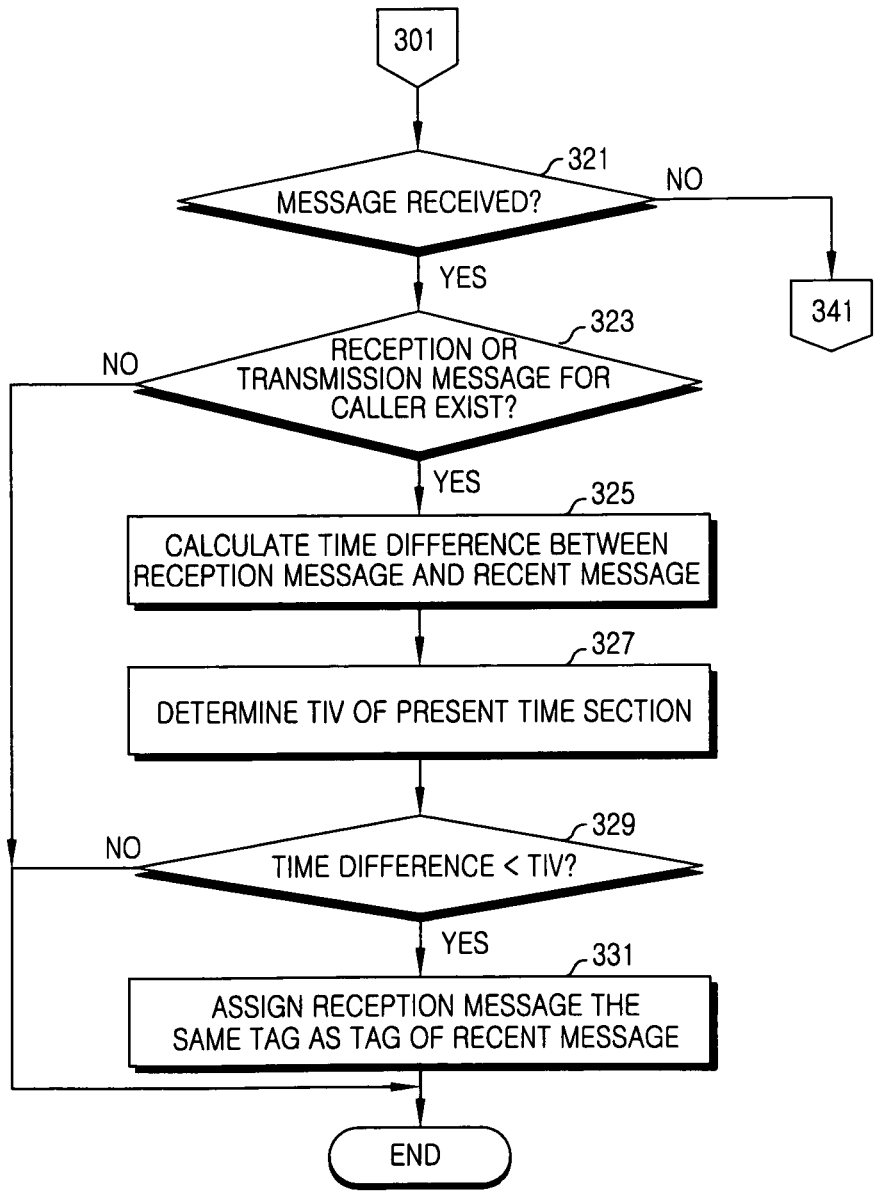
Figure 3C:
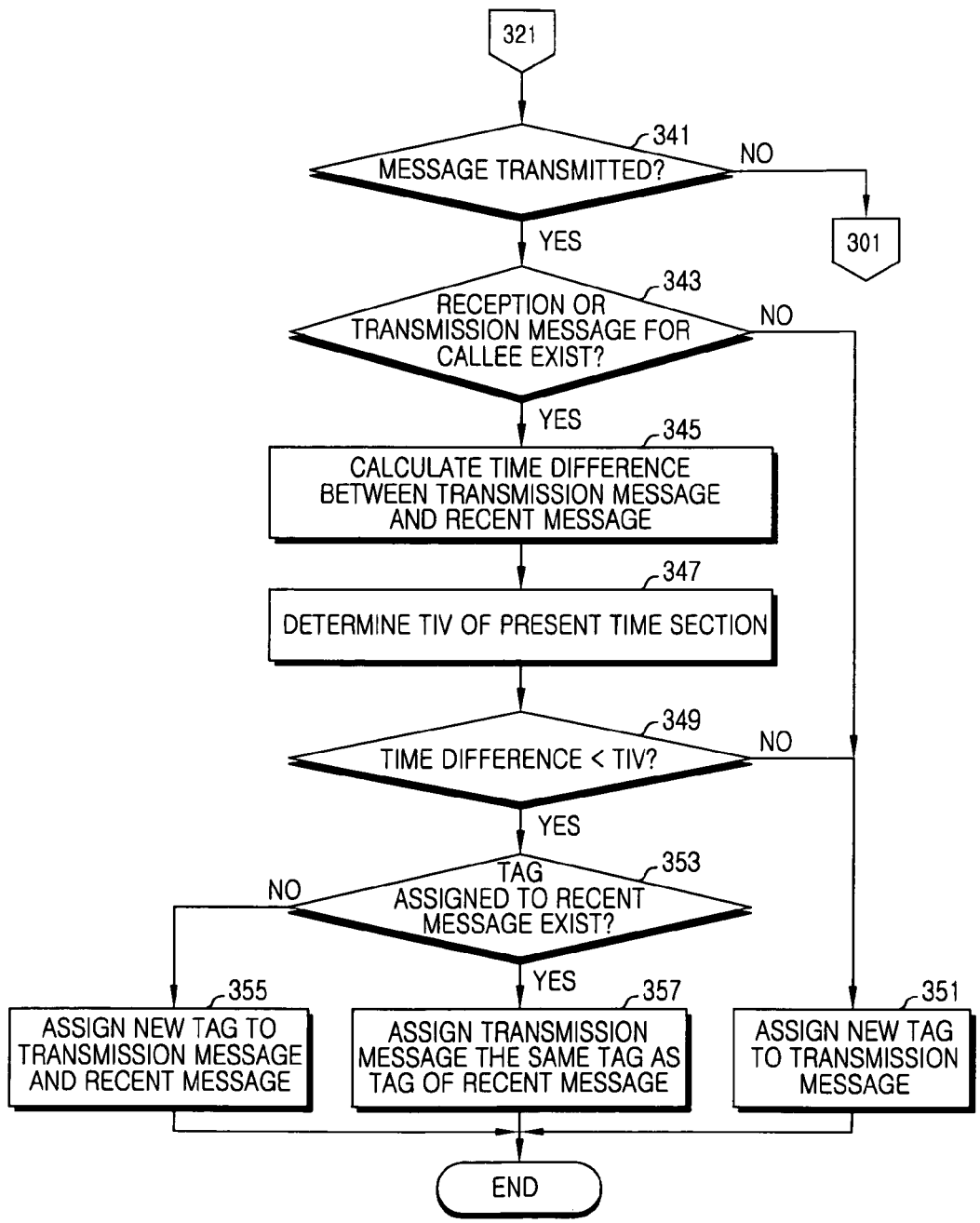

FIGS. 3A to 3C illustrate flowcharts for a tag assigning procedure of a mobile terminal according to an exemplary embodiment of the present invention.

Referring to FIGS. 3A to 3C, the mobile terminal determines whether a reply message is transmitted in step 301.

When the reply message is transmitted, the mobile terminal calculates a reply transmission time difference, and calculates an average of reply transmission time differences in step 303. Here, the average of the reply transmission time differences is an average of time sections including a transmission time of the reply message.

After calculating the average of the reply transmission time differences, the mobile terminal updates a TIV of a relevant time section, that is, a time section including a transmission time of the reply message in step 305. Accordingly, the mobile terminal calculates the TIV and updates an already set TIV using the average. For example, the mobile terminal immediately sets the average as the TIV, or transforms the average according to a specific rule and then sets it as the TIV.

After updating the TIV, the mobile terminal determines whether a tag assigned to an original message, that is, an object message of the reply message, exists in step 307. That is, the mobile terminal determines whether stored data of the original message includes a tag.

When the tag exists in the original message, the mobile terminal assigns the reply message the same tag as a tag of the original message in step 309. That is, the mobile terminal incorporates the same tag into stored data of the reply message. Therefore, the reply message and the original message are identified as related messages.

In contrast, when a tag assigned to the original message does not exist, the mobile terminal generates a new tag and assigns the new tag to both the reply message and the original message in step 311. That is, the mobile terminal incorporates the new tag into stored data of the reply message and stored data of the original message. Therefore, the reply message and the original message are identified as related messages.

When the reply message is not transmitted in step 301, the mobile terminal determines whether a message is received in step 321.

When the message is received, the mobile terminal determines whether a reception or transmission message for a caller of the message exists in step 323. As such, the mobile terminal determines whether a message received from the caller or a message transmitted to the caller in the past has been stored. When a reception or transmission message for the caller does not exist, the mobile terminal ends the present procedure.

Alternatively, when the reception or transmission message for the caller exists, the mobile terminal calculates a time difference between the message received in step 321 and a recent message, that is, a message recently generated among received or transmitted messages in the past in step 325. Accordingly, when the recent message is a received message, the mobile terminal calculates a time difference between a reception time of the received message and a reception time of the recent message. Alternatively, when the recent message is a transmission message, the mobile terminal calculates a time difference between a reception time of the received message and a transmission time of the recent message.

After calculating the time difference, the mobile terminal determines a TIV of a present time section in step 327. That is, the TIV is managed differently for each time section, and the mobile terminal determines a TIV of a time section including a reception time of the received message.

After determining the TIV, the mobile terminal determines the time difference and the TIV in step 329. When the time difference is equal to or greater than the TIV, the mobile terminal ends the present procedure.

Alternatively, when the time difference is smaller than the TIV, the mobile terminal assigns the received message the same tag as a tag of the recent message in step 331. That is, the mobile terminal incorporates the same tag into stored data of the received message. Therefore, the received message and the recent message are identified as related messages.

When the message is not received in step 321, the mobile terminal determines whether a message is transmitted in step 341. When the message is not transmitted, the mobile terminal returns to step 301.

Alternatively, when the message is transmitted, the mobile terminal determines whether a received or transmitted message for a callee of the message exists in step 343. Accordingly, the mobile terminal determines whether a message received from the callee or a message transmitted to the callee in the past has been stored. When the received message or the transmitted message for the callee does not exist, the mobile terminal proceeds to step 351.

Alternatively, when the received message or the transmitted message for the callee exists, the mobile terminal calculates a time difference between the message transmitted in step 341 and a recent message, that is, a message recently generated among received or transmitted messages in the past in step 345. That is, when the recent message is a received message, the mobile terminal calculates a time difference between a transmission time of the transmitted message and a reception time of the recent message. Alternatively, when the recent message is a transmission message, the mobile terminal calculates a time difference between a transmission time of the transmitted message and a transmission time of the recent message.

After calculating the time difference, the mobile terminal determines a TIV of a present time section in step 347. That is, the TIV is managed differently for each time section, and the mobile terminal determines a TIV of a time section including a transmission time of the transmitted message.

After determining the TIV, the mobile terminal determines the time difference and the TIV in step 349.

When the time difference is equal to or greater than the TIV, the mobile terminal generates a new tag and assigns a new tag to the transmitted message in step 351.

Alternatively, when the time difference is smaller than the TIV, the mobile terminal determines a tag assigned to the recent message exists in step 353. That is, the mobile terminal determines whether the tag is included in stored data of the recent message.

When the tag has not been assigned to the recent message, the mobile terminal generates a new tag and assigns the new tag to both the transmitted message and the recent message in step 355. Therefore, the transmitted message and the recent message are identified as related messages.

Alternatively, when the tag has been assigned to the recent message, the mobile terminal assigns the transmitted message the same tag as a tag of the recent message in step 357. That is, the mobile terminal incorporates the same tag into stored data of the transmitted message. Therefore, the transmitted message and the recent message are identified as related messages.

Figure 4:
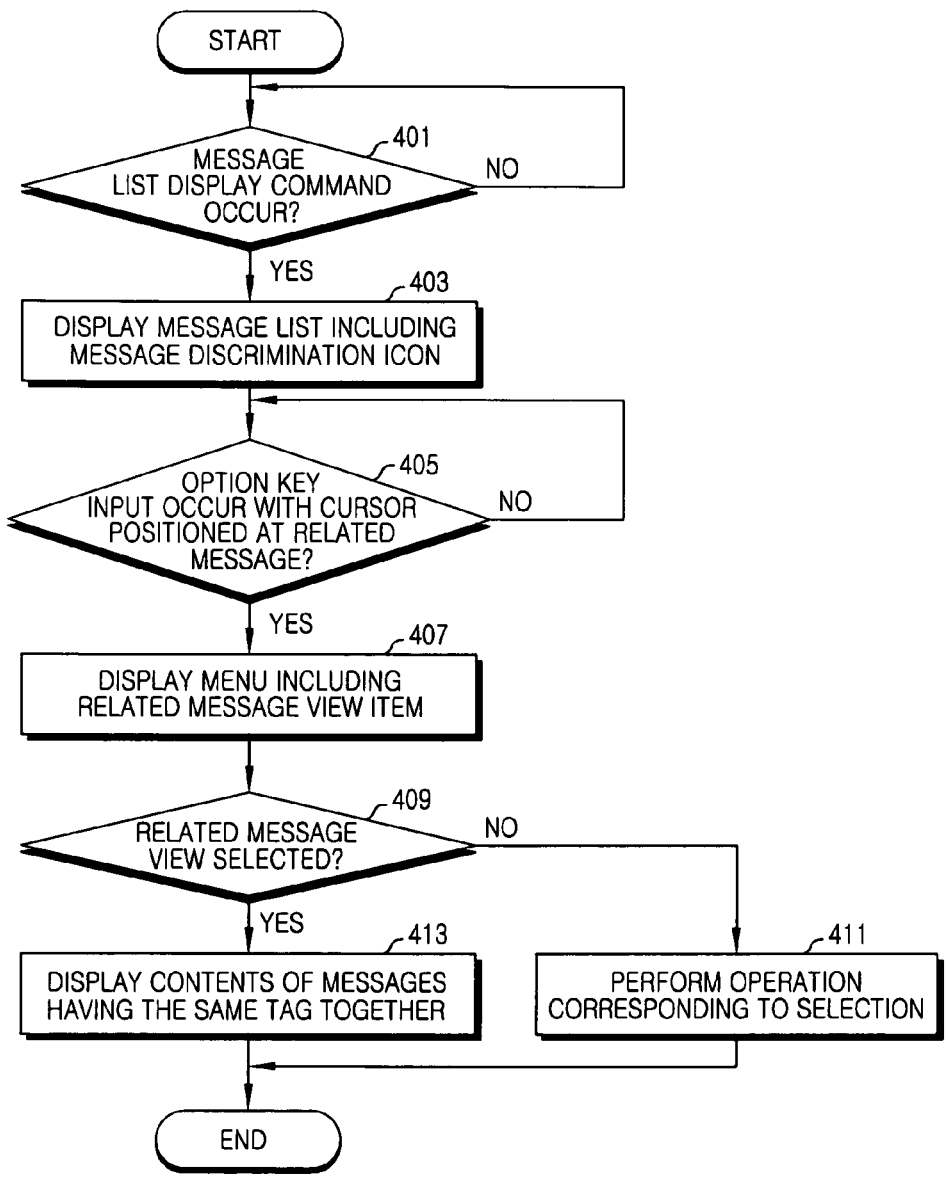
FIG. 4 illustrates a flowchart for a message displaying procedure of a mobile terminal according to an exemplary embodiment of the present invention.

FIG. 4 illustrates a flowchart for a message displaying procedure of a mobile terminal according to an exemplary embodiment of the present invention.

Referring to FIG. 4, the mobile terminal determines whether a message list display command occurs in step 401. That is, the mobile terminal determines whether an event corresponding to message list display occurs by a user's manipulation.

When the message list display command occurs, the mobile terminal displays a message list including a message discrimination icon in step 403. Here, the message discrimination icon is designed for discriminating between a message having a related message and a general message, and displayed per message. For example, the message discrimination icon includes the general message icon 111 and the related message icon 113 illustrated in FIG. 1A.

After that, the mobile terminal determines whether an option key input occurs with a cursor positioned at a related message in step 405. That is, the mobile terminal determines whether the option key is input after the cursor is positioned at a related message by the user's manipulation.

When the option key input occurs with the cursor positioned at the related message, the mobile terminal displays a menu including a related message view item in step 407. For example, the mobile terminal displays a menu including a 'related message view' item as illustrated in FIG. 1A. At this point, the menu may be displayed to overlap the message list.

After displaying the menu, the mobile terminal determines whether the related message view item is selected in step 409. For example, the mobile terminal determines whether a selection key or an OK key is input after the cursor is moved to the related message view item by the user's manipulation. That is, the mobile terminal determines whether a related message view command occurs.

When an item other than the related message view item is selected, the mobile terminal performs an operation corresponding to the user's selection in step 411. For example, when a delete item is selected, the mobile terminal deletes a relevant message. When a message view item is selected, the mobile terminal displays the contents of a relevant message.

Alternatively, when the related message view item is selected, the mobile terminal recognizes a related message view command occurs and displays the contents of messages having the same tag as a tag of a relevant message together in step 413. For example, the mobile terminal displays the contents of related messages together as illustrated in FIG. 1B.

The mobile terminal can provide convenience of allowing a user to check the contents of related messages at a time by assigning the same tag to related messages and identifying the related messages using the tag.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A method for displaying a message in a mobile terminal, the method comprising:

determining a threshold for message tag assignment based at least in part on a time section of a day that a message is transmitted or received between the mobile terminal and another mobile terminal, wherein different time sections of the day are associated with different thresholds for message tag assignment;

determining, when the message is transmitted or received between the mobile terminal and the other mobile terminal, whether a time difference between a time of day that the message is transmitted or received and a time when at least one stored message, which has been received or transmitted between the mobile terminal and the other mobile terminal, is transmitted or received is smaller than the determined threshold;

assigning the message a same tag as a tag of the at least one stored message when the time difference is smaller than the determined threshold; and displaying the messages having the same tag, wherein determining the threshold for message tag assignment further comprises:

calculating, for each of multiple reply messages, each of multiple reply transmission time differences between a time of the each of multiple reply messages that is transmitted and a time of an object message of the each of multiple reply messages;

calculating an average of the multiple reply transmission time differences; and determining the threshold for the time section when the reply message is transmitted using the average.

2. The method of claim 1, wherein the determining of whether the time difference between the time of day that the message is transmitted or received and a time when at least one stored message is transmitted or received is smaller than the determined threshold comprises:

when the message is received from the other mobile terminal, determining whether at least one stored message received or transmitted between the mobile terminal and the other mobile terminal exists;

calculating a time difference between a reception time of the message and one of a reception time and a transmission time of a recent message among the at least one stored message; and determining whether the time difference is smaller than the threshold for a time section when the message is received.

3. The method of claim 1, further comprising:

displaying, when a message list display command occurs, a message list comprising a message discrimination icon for discriminating between a related message and a general message;

displaying a menu comprising a related message view item when an option key is input with a cursor positioned at the related message; and recognizing, when the related message view item is selected, the related message view command occurs.

4. The method of claim 1, wherein displaying the messages having the same tag comprises:

displaying, at a display, contents of messages that comprise the same tag when a related message view command for one of the message and the at least one stored message occurs.

5. The method of claim 1, further comprising:

when the message is a reply to an original message, assigning the message the same tag as a tag of the original message, which is an object of the reply.

6. The method of claim 5, further comprising, when a tag assigned to the original message does not exist, assigning a new tag to the message and the original message.

7. The method of claim 1, wherein:

the threshold is determined based on time section, among a plurality of time sections, during which the message is transmitted or received, each of the time sections comprises a different predetermined block of contiguous calendar time during a day, each of the time sections is associated with a different threshold, and the plurality of time sections are contiguous time blocks that collectively comprise a twenty-four (24) hour day.

8. The method of claim 7, wherein thresholds for each of the time sections are independently determined.

9. The method of claim 1, wherein the determining of whether the time difference between the time of day that the message is transmitted or received and a time when at least one stored message is transmitted or received is smaller than the determined threshold comprises:

determining when the message is transmitted to the other mobile terminal, whether at least one stored message received or transmitted between the mobile terminal and the another mobile terminal exists;

calculating a time difference between a transmission time of the message and one of a reception time and a transmission time of a recent message among the at least one stored message; and determining whether the time difference is smaller than the threshold for a time section when the message is transmitted.

10. The method of claim 9, further comprising:

when at least one stored message received or transmitted between the mobile terminal and the other mobile terminal does not exist, or, when the time difference is equal to or greater than the threshold, assigning a new tag to the message.

11. The method of claim 9, further comprising:

assigning a new tag to the message and the recent message when a tag assigned to the recent message does not exist.

12. An apparatus for a mobile terminal, the apparatus comprising:

a memory;

transceiver configured to transmit a reply message; and processing circuitry coupled to the memory and the transceiver, the processing circuitry configured to:

determine a threshold for message tag assignment based at least in part on a time section of a day that a message is transmitted or received between the mobile terminal and another mobile terminal, wherein different time sections of the day are associated with different thresholds for message tag assignment;

when the message is transmitted or received between the mobile terminal and the other mobile terminal, determine whether a time difference between a time of day that the message is transmitted or received and a time when at least one stored message, which has been received or transmitted between the mobile terminal and the other mobile terminal, is transmitted or received is smaller than the determined threshold;

when the time difference is smaller than the determined threshold, assign the message a same tag as a tag of the at least one stored message; and cause a display to display the messages having the same tag, wherein to determine the threshold for message tag assignment, the processing circuitry is further configured to:

calculate, for each of multiple reply messages, each of multiple reply transmission time differences between a time of the each of multiple reply messages that is transmitted and a time of an object message of he each of multiple reply messages, calculate an average of the multiple reply transmission time differences, and determine the threshold for the time section when the reply message is transmitted using the average.

13. The apparatus of claim 12, wherein when the message is received from the other mobile terminal, the processing circuitry is configured to determine whether at least one stored message received or transmitted between the mobile terminal and the other mobile terminal exists, calculate a time difference between a reception time of the message and one of a reception time and a transmission time of a recent message among the at least one stored message, and when the time difference is smaller than the threshold for a time section when the message is received.

14. The apparatus of claim 12, wherein when at least one stored message received or transmitted between the mobile terminal and the other mobile terminal does not exist, or, when the time difference is equal to or greater than the threshold, the processing circuitry is configured to assign a new tag to the message.

15. The apparatus of claim 12, wherein the display is configured to display a message list comprising a message discrimination icon configured to discriminate between a related message and a general message when a message list display command occurs, and display a menu comprising a related message view item when an option key is input with a cursor positioned at the related message.

16. The apparatus of claim 12, wherein the display is configured to display contents of a message that comprise the same tag, when a related message view command for one of the message and the at least one stored message occurs.

17. The apparatus of claim 12, wherein when the message is a reply to an original message, the processing circuitry is configured to assign the message the same tag as a tag of the original message, which is an object of the reply.

18. The apparatus of claim 17, wherein when a tag assigned to the original message does not exist, the processing circuitry is configured to assign a new tag to the message and the original message.

19. The apparatus of claim 12, wherein when the message is transmitted to the other mobile terminal, the processing circuitry is configured to determine whether at least one stored message received or transmitted between the mobile terminal and the another mobile terminal exists, calculate a time difference between a transmission time of the message and one of a reception time and a transmission time of a recent message among the at least one stored message, and determine whether the time difference is smaller than the threshold for a time section when the message is transmitted.

20. The apparatus of claim 19, wherein when a tag assigned to the recent message does not exist, the processing circuitry is configured to assign a new tag to the message and the recent message.

21. The apparatus of claim 12, wherein:
the threshold is determined based on time section, among a plurality of time sections, during which the message is transmitted or received,
each of the time sections comprises a different predetermined block of contiguous calendar time during a day,
each of the time sections is associated with a different threshold, and
the plurality of time sections are contiguous time blocks that collectively comprise a twenty-four (24) hour day.

22. The apparatus of claim 21, wherein thresholds for each of the time sections are independently determined.

* * * * *